United States Patent Office 3,825,459
Patented July 23, 1974

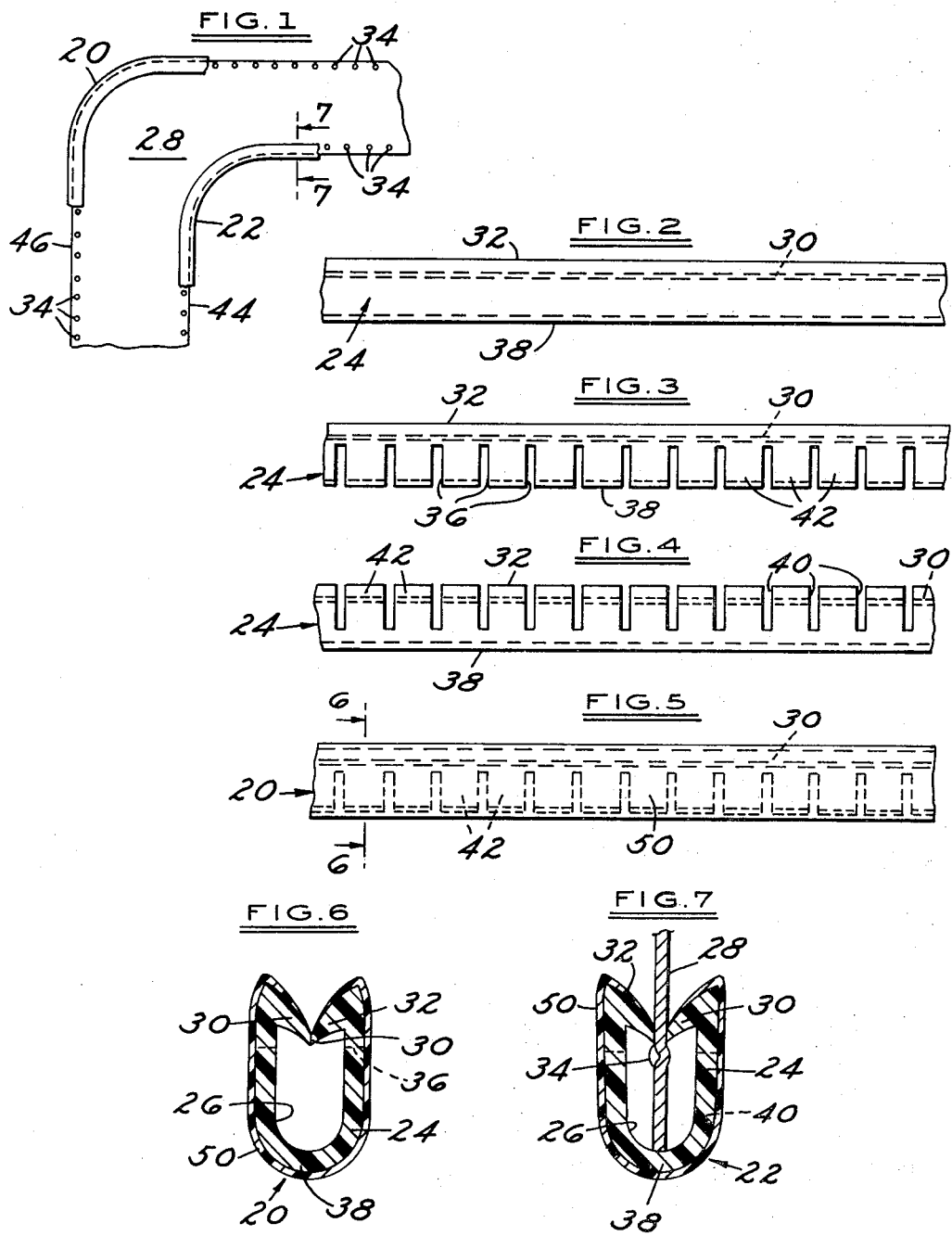

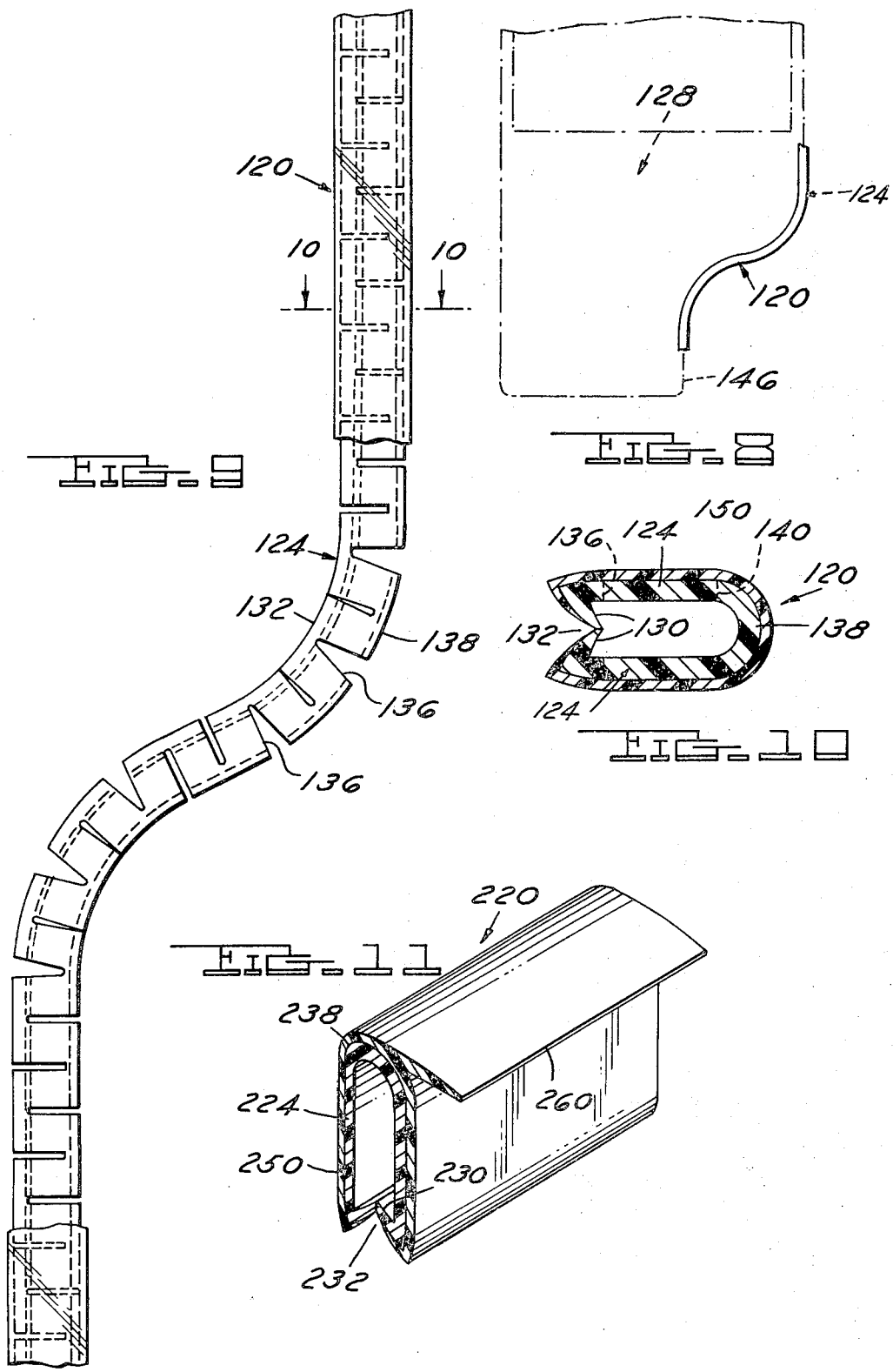

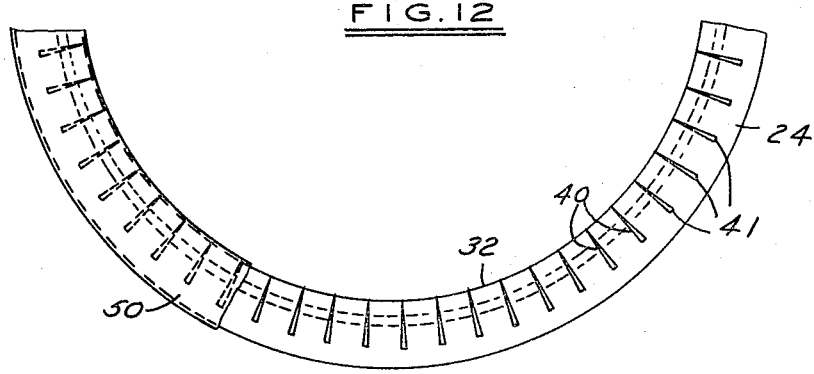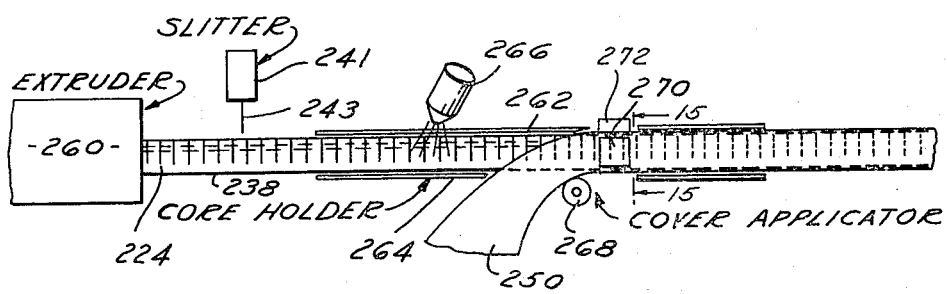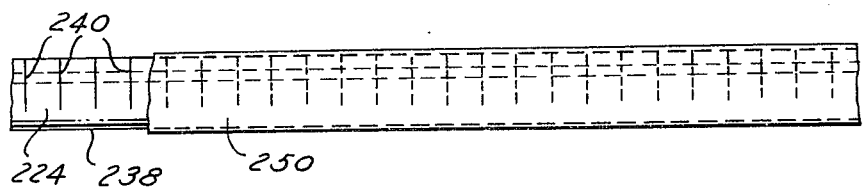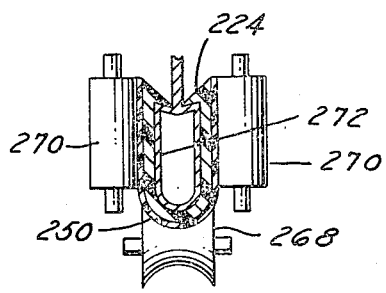

3,825,459
METHOD OF MAKING FLEXIBLE
MOLDING STRIP
Alfred E. Taylor, Grosse Pointe, Mich.
Application Jan. 10, 1972, Ser. No. 216,409, now Patent No. 3,706,173, dated Dec. 19, 1972, which is a continuation-in-part of abandoned application Ser. No. 850,434, Aug. 15, 1969. Divided and this application Sept. 18, 1972, Ser. No. 290,156
Int. Cl. B32b 31/12
U.S. Cl. 156—244               5 Claims

ABSTRACT OF THE DISCLOSURE

A flexible molding strip including a non-metal channel-shaped core member having a plurality of transverse slots providing the requisite molding flexibility, and a stretchable cover enclosing the core member and concealing the slots. The core member includes opposed gripping flanges within the channel adapted to secure the molding, and the cover may be stretched over the core to prevent buckling when the molding is secured over a relatively sharp radius. The cover may also include a laterally extending flange or wing to conceal a joint or the like.

CROSS-REFERENCE TO RELATED APPLICATIONS

This application is a division of application Ser. No. 216,409, filed Jan. 10, 1972, now U.S. Pat. 3,706,173, which is a continuation-in-part of application Ser. No. 850,434, filed Aug. 15, 1969, and now abandoned.

FIELD OF THE INVENTION

This invention relates to flexible molding strips, such as utilized to conceal exposed edges, joints, cracks, etc. in automotive applications, appliances, furniture, construction or the like. In the automotive field, for example, the molding strip of this invention may be utilized as a wind seal around the door panel, trim around the interior windows and other exposed metal edges for appearance and safety. The automotive applications are considered typical of the field or use in other areas, and therefore the invention will primarily be described in regard to automotive applications.

DESCRIPTION OF THE PRIOR ART

The conventional interior molding presently utilized in the automotive industry is generally one of two types: The first type is merely a rigid channel-shaped plastic extrusion which is preformed to the desired shape; the second type is also channel-shaped, but includes a wire mesh "backbone" and a vinyl cover, making the molding flexible. The first described molding is extruded in the straight form, but is reheated and shaped to fit the intended curvature, because of the rigidity of the molding. An automotive window application, for example, generally includes two L-shaped parts which extend from the upper center of the window, sideways and down. A third part is provided across the bottom of the window. Because of the rigidity of the parts, however, each automotive model may require different molding configurations, and as many as twenty different color combinations.

The relative flexibility of the wire reinforced molding permits forming or bending of the molding around the window opening, and generally only requires one joint. The extruded plastic molding is, however, considerably less expensive to manufacture than the wire reinforced molding, but the cost of stocking the large number of parts necessary for production and the greater installation cost nearly compensates for the greater initial cost of the wire reinforced molding. A need therefore remains for a relatively inexpensive flexible molding such as described in the instant application.

The prior art discloses a number of reinforced molding strips, some of which are flexible, however the majority of the devices are either as expensive as the wire reinforced molding described hereinabove, or are not suitable for the application intended for the flexible molding strip of this invention. Further, the applicant has found that a molding utilizing encapsulated metal segments, or a slitted metal strip is not as flexible as the molding of this invention, and is considerably more expensive to manufacture. The following United States Patents are cited as examples of moldings shown by the prior art:

| | |
|---|---|
| 1,918,666 | 3,290,826 |
| 2,634,467 | 3,310,928 |
| 2,894,298 | 3,363,364 |
| 3,067,455 | 3,392,498 |
| 3,159,251 | 3,394,044 |
| 3,197,821 | 3,399,448 |
| 3,200,448 | 3,401,075 |
| 3,222,769 | 3,371,447 |

SUMMARY OF THE INVENTION

The flexible molding strip of this invention includes a non-metal channel-shaped core member and a stretchable cover. The core member is formed of a relatively rigid material, and includes a plurality of transverse slots extending through one or both edges generally perpendicular to the axis of the molding to provide the requisite flexibility to receive the molding on a curved surface, such as the interior window opening of an automobile. Internal gripping flanges are provided within the channel of the core member to secure the molding on a member received therein. In the disclosed embodiment, the channel is provided with a pair of opposed gripping flanges which extend from adjacent the open side of the channel inwardly, at an acute angle, to grip dimples or the like provided on the exposed projecting metal edge of the window opening. The location of the transverse slots will depend upon the particular application of the molding strip of this invention. In one of the preferred embodiments of the invention, the slots are provided through the bight portion of the channel-shaped core member when the molding is to be received over a convex curvature. Conversely, the slots may be provided through the open side of the channel-shaped core, when the molding is to be received on a concave curvature. A universally flexible core member and molding strip is also disclosed, wherein the slots extend through both the bight portion and the open side of the core member. In this embodiment, the slots may extend alternatively through the bight portion and the open side of the channel to provide universal flexibility throughout, however the slots may also be positioned to accommodate a specific curvature. In the disclosed embodiments, the transverse slots are substantially evenly spaced, dividing the core member into segments having a length equal to less than the width of the core member, and the depth of the slots is preferably greater than the width of the core member to provide sufficient resiliency or flexibility for relatively sharp radii.

In the preferred embodiment of the flexible molding strip of this invention, the cover member is received over and encloses the bight portion of the core member and extends to adjacent the open side. The cover member may be secured to the core by any suitable means, and serves to conceal the slots and permit the molding to be used as a seal or the like around the automotive door panel, for example. The cover member may be stretched over the core member, prior to its securement to the core member, to prevent buckling when the molding is received over a sharp bend. In the disclosed embodiments, the cover is a thin sheet of resilient plastic, which is preferably opaque to conceal the slots.

In one of the disclosed embodiments of the invention, the cover member includes a laterally extending flange or "wing" which may be utilized to conceal or seal a joint, such as the adhesive utilized around an automotive window. The core member may be identical to the core member in the other embodiments disclosed, or the core member may also include a flange reinforcing the cover member. It will be understood that in automotive applications, for example, the core member may therefore be formed from a neutral color, such as white or gray, and the cover member may be formed from the distinctive color of the automotive interior or trim.

The molding strip of this invention is sufficiently flexible to utilize a single strip around the automotive window openings, for example, and is considerably less expensive than the wire reinforced moldings presently utilized. Further, the molding of this invention is sufficiently flexible to compensate for irregularities in the member receiving the molding, and is suitable for compound curvatures. The flexible molding of this invention therefore combines the advantages of the molding strips presently utilized in automotive applications, without their disadvantages.

BRIEF DESCRIPTION OF THE DRAWINGS

FIG. 1 is a top elevation of an L-shaped panel utilizing the flexible molding strip of this invention;

FIG. 2 is a side elevation of one embodiment of the core extrusion utilized in the mold strip of this invention;

FIG. 3 is a side elevation of one embodiment of the core member utilized in the molding strip of this invention;

FIG. 4 is another embodiment of the core member utilized in the molding strip of this invention;

FIG. 5 is a side elevation of one embodiment of the molding strip of this invention;

FIG. 6 is a cross-sectional end view of the molding strip shown in FIG. 5, in the direction of view arrows 6—6;

FIG. 7 is an end cross-sectional view of the molding strip shown in FIG. 1, in the direction of view arrows 7—7;

FIG. 8 is a side elevation of another embodiment of the molding strip of this invention;

FIG. 9 is an enlarged view of the embodiment of the molding strip in FIG. 8, partially cut away to show the core member;

FIG. 10 is a cross-sectional view of the molding strip shown in FIG. 9, in the direction of view arrows 10—10;

FIG. 11 is a perspective view of another embodiment of the molding strip of this invention;

FIG. 12 illustrates bending of the core to close the slots during adhering of the cover;

FIG. 13 illustrates a flexible molding strip having fissures rather than the wider slots shown in FIGS. 3–5;

FIG. 14 schematically illustrates the method of making the trim strip of FIG. 13; and FIG. 15 is a cross-sctional view taken along the line 15—15 of FIG. 14.

DESCRIPTION OF THE PREFERRED EMBODIMENTS

The molding assembly shown in FIG. 1 includes two embodiments of the flexible molding strip of this invention. The convex molding strip embodiment 20 is also shown in FIGS. 5 and 6, and the concave molding strip embodiment 22 is shown in FIG. 7. Each of these embodiments of the molding strip of this invention includes a flexible non-metal core member, which may be formed from the extrusion 24 shown in FIG. 2. The extrusion is preferably formed from a relatively rigid non-metal to provide the requisite rigidity for securement and avoid the metal-to-metal contact provided by many of the metal reinforced molding strips disclosed in the prior art. The core extrusion is preferably formed from an extrudable plastic, such as polypropylene, ABS or acrylonitrile-butadiene-styrene, Tenite polyallomer available from Eastman Chemical Products, Inc., linear polyethylene, nylon, Delrin etcetera, or the core member may be molded or otherwise formed from other materials including hard rubber, all of which materials are herein generically referred to as plastic.

The core member 24 is preferably channel-shaped, as shown in FIGS. 6 and 7, to receive the panel or the like 28 in the channel 26, as shown in FIGS 1 and 7. In this embodiment, the core member includes a pair of opposed integral gripping flanges 30 which extend from adjacent the open end 32 of the channel-shaped extrusion, inwardly at an acute angle to the axis, and abut or nearly abut as shown in FIGS. 6 and 7. The flanges 30 are also relatively rigid as they are integral with the channel portion, and extend at an acute angle to provide a secure lock with the dimples 34 provided on the panel 28.

The core member is then provided with a plurality of transverse slots generally perpendicular to the axis of the linear extrusion, as shown in FIGS. 3 and 4. The slots 36 in FIG. 3 extend through the bight portion 38 of the channel-shaped core member and the slots 40 extend through the open edge 32 of the channel, as shown in FIG. 4. The slots divide the core extrusion 24 into a plurality of segments 42 which are jointed along the longitudinal edge of the channel. The slots provide the flexibility in the core member required to secure the molding on a curved edge, such as the concave edge 44 and the convex edge 46 in FIG. 1.

The panel 28 shown in FIG. 1 represents a typical application of the flexible molding or trim strip of this invention. The concave edge 44 is similar to the interior edge around an automotive window, the convex edge 6 would be similar to the interior molding application or wind seal around an automotive door panel. In either application, the flexible molding of this invention can be applied in a single strip, without preforming or metal securement means. The panel, which is normally sheet metal, may be provided with a plurality of substantially evenly spaced dimples 34 adjacent the edge receiving the molding. Alternate dimples normally project in opposite directions from the opposed faces of the panel, as shown in FIG. 7, to provide opposed gripping surfaces. Conventional tools are available for this purpose.

The location and shape of the slots will depend upon the particular application. In the convex molding strip 20, the slots 36 extend through the bight portion 38 of the channel, as shown in FIG. 3, such that the linear segments 42 are spread at the areas of curvature. Conversely, the slots 40 in the concave molding strip 22 extend through the open edge 32 of the channel, as shown in FIG. 4, such that the segments also spread in the concave curve. In either embodiment, therefore, the slots open to accommodate the curvature of the panel, and provide the flexiblity required to secure the molding over a curved edge. It will be understood, however, that either embodiment may be utilized over a relatively stright edge, or an edge having a relatively large radius. The slots may also be widened or V-shaped to accommodate various curvatures.

The width and depth of the slots will normally depend upon the width and rigidity of the core extrusion 24. A slot 0.060 to 0.080 inches wide and approximately 0.375 inches deep has been found suitable for an extrusion approximately 0.50 inches wide, which is the size molding presently utilized in interior automotive applications. The slots preferably have a depth greater than one-half the width of the core. The spacing of the slots will also depend upon the particular application. The slots are required at the area of curvature, but may be spaced further apart or omitted at the straight portions of the panel. In this embodiment, the linear length of the segments 42 is preferably less than the width of the core member, at least at the area of curvature. The slots may be formed by a number of conventional methods, or a special tool may be utilized. For example, the slots may be formed by a series of parallel saw blades mounted for rotation on a common axis. The saw blade unit could be mounted on any axis, and would be in the nature of a "flying cutoff," travelling at the same rate as the extrusion. The saw blade unit could also be fixed in position, and simply moved fast enough through the extrusion such that the slots are not cut to an excessive width. A hot wire system consisting of a series of parallel hot wires could also perform the cutting operation, however, this would be a slower operation.

Finally, a stretchable cover 50 is received over and secured to the core member, as shown in FIGS. 5 to 7. The cover member is preferably formed of a relatively elastic material, which is stretchable over the core member to conform to the shape thereof before and after securement of the molding to the panel. The cover in the flexible molding strip of this invention performs a number of functions. The cover is preferably opaque to cover and conceal the slots, as shown in FIGS. 1 and 5, and may be colored to compliment the interior of an automobile, chair upholstery or the like. It is important to note that the core member may then be formed of a neutral color, reducing the cost of the molding assembly as described hereinabove. The cover may also be embossed to better conceal the slots. The cover also functions as a seal, where the molding is to be utilized as a seal, such as the wind seal secured around an automotive door panel. Further, the material of the cover may be chosen to cause the molding to retain the shape of the panel edge receiving the molding, inhibiting return of the molding to its original straight configuration. This aids the retention of the molding on the panel. The cover may be formed from a variety of materials, including a relatively thin sheet of plastic, such as soft vinyl, natural or synthetic rubber, a woven elastic material, or a variety of foam materials.

In the disclosed embodiment, the cover 50 is folded over the bight portion 38 of the core member and extends to the open edge 32 of the channel. The cover may also be folded over the open ends of the channel, but is spaced from the abutting edges of the flanges 30 to provide direct locking contact between the relatively rigid flanges and the dimples 34 in the panel. The cover thereby covers and conceals the slots in the core member, but does not interfere with the locking action of the flanges. The cover is preferably secured to each of the linear segments 42 of the core member, such that the cover will conceal the slots, without buckling when the molding is bent over the curved panel edge.

The cover may be secured to the core member by any method adapted to provide full securement and prevent buckling. Heat may be applied to the surface of the core member, after slotting, and the cover may be fed directly over the core from the extruder. Conversely, the cover member may be stored on a roll, and heated prior to receipt on the core member, or the members may be extruded and jointed simultaneously from a cross head extruder. A sonic welding system may also be utilized to secure the cover, or the cover may be adhesive or solvent bonded to the core.

In certain applications of heat and pressure, or bonding, the cover may be caused to fill the slots or the slots may be filled with adhesive or solvent. Normally, this may not present a problem, and has certain advantages in specific applications. In the applications where this is considered a disadvantage, the core may be fed over a fixed mandrel having a cross section similar to the inside of the core, which would support the core against the pressure of the rolls. The mandril may have an external cross section similar to the inside of the core, including external ribs which fit into the slots. Such a mandril would move with the extrusion as it is processed and prevent filling of the slots. Another method, which would at least partially prevent slot filling, includes a wheel which receives the core prior to securement of the cover. The wheel would tend to close the slots during securement of the cover and the cover would be stretched in tension when returned to the normal straight configuration. This would provide a considerable advantage in certain applications as described hereinbelow.

In FIG. 12 I have depicted a length of the core 24 bent into a curved configuration with the open edge 32 of the U-shaped channel lying on the inside of the curve. By so bending the core, the slots 40 are essentially closed, except for a small portion at the inner end 41 of each slot. Such bending of the core before applying the adhesive and holding it in such position during application of the cover 50, substantially prevents the adhesive or cover from entering the slots, and upon releasing the strip the cover is tensioned. Bending the strip along the same radius as that shown or a greater radius, or along reverse bend will fully conceal the slots as the cover is in a stretched condition covering and concealing them. While the core 24 is shown bent in FIG. 12 it is to be understood that the core shown in FIG. 13 may be similarly bent to close its slots during application of the core.

It will be noted from FIG. 1 that when the flexible molding strip of this invention, either molding strip 20 or 22, is bent over the curved edge of the panel 28, a portion of the cover is placed in compression and a portion is disposed in tension. This may result in buckling of the portion of the cover in compression where the radius of the curvature is relatively sharp or small. It will be understood that buckling of the cover should not occur where the radius of curvature is relatively large, or where the panel edge receiving the molding is relatively straight. In the disclosed embodiment, the portion of the cover closest the center of curvature is placed in compression, and the portion farthest from the center is in tension. In the above concave molding strip 22, for example, the outer edge away from the panel is in compression, and the inner edge overlying the panel is in tension. The problem of buckling has been solved in the flexible molding strip of this inveniton by stretching the cover over the core member prior to securement of the cover. The requisite degree of stretching will depend upon the radius of curvature of the panel, but should be sufficient to compensate for the compression of the cover described hereinabove. The cover may be stretched by conventional methods, including the method described above.

The embodiment of the molding strip 120 shown in FIGS. 8 to 10 may be characterized as universally flexible, and is specifically adapted for molding applications having a multiple curvature, such as the S-shaped panel edge 146 shown in FIG. 8. An S-shaped curvature is presently utilized on the lower-rear edge of the rear door panel of several automobile models, such as the rear door panel 128 shown in phantom in FIG. 8. It will be understood, however, that almost any curvature may be accommodated by this embodiment of the molding strip.

The core member 124, in this embodiment, is slotted through both the bight portion 138 and the open side 132, providing flexibility in both directions. The slots 136 through the bight portion provide "concave" flexibility, and the slots 140 through the open side 132 provide "convex" flexibility, as shown in FIG. 9. The core extrusion and the cover 150 may be otherwise identical to the molding strip embodiments described hereinabove, and have been numbered in sequence accordingly.

The embodiment of the molding strip 220 shown in FIG. 11 may also be identical to any of the embodiments disclosed hereinabove, except that the cover portion 250 includes a laterally extending flange or "wing" 260 which may be utilized to conceal or seal a joint or the like. In an automotive application, for example, the wing may be utilized to conceal the adhesive used around the windows. Where additional rigidity is required, such as in sealing applications, the core member 224 may also be provided with a lateral flange, preferably concealed within the cover member flange 260. The slots, not shown, are preferably provided through the open side of the channel-shaped core member, such that the flange does not interefere with the flexibility of the molding, as shown in FIG. 4. The slots in the core member may, however, be provided through either edge, as shown above. FIG. 11 is otherwise numbered similar to the embodiments described hereinabove.

The flexible molding strip of this invention is sufficiently flexible to be secured over a wide variety of panel curvatures, perpendicular to the axis of the core member, and can also flex to compensate for irregularities in the panel edge, including a compound curvature. Further, the molding or trim strip of this invention is considerably less expensive than the commercially available wire reinforced trim strips or the metal clip reinforced strips shown by the prior art. The trim generally may be attached in a single strip, reducing the labor cost, and may be made available in a wide variety of colors, although a common color is utilized for the core member which represents the bulk of material.

A further modification of the flexible molding strip is shown in FIG. 13 wherein the cover 250 is shown removed, for purposes of illustration only, at the left-hand end of the strip to expose the core 224. This embodiment is similar to that shown in FIG. 1 at 22 and in FIG. 7 except that the slots 240 are very narrow and may be more properly termed fissures or slits which should be as narrow as possible. They may be formed by a slitting apparatus which rather than removing any substantial, if any, portion of the core, in contradistinction to the slots 40, slices or cleaves through the core to form the fissures or slits 240. Such slits are held closed during adhering of the cover 250 to the core preventing any appreciable, if any at all, penetration by the cover or by adhesive (by which the cover may be secured to the core) into the slits. Such slits simplify adhering the cover to the core as the slits are essentially closed when the core is in a rectilinear posture and consequently the cover and/or adhesives can be applied to the core without either bending the core to close the slits or resorting to other expedients heretofore suggested. With the core being in a rectilinear posture when the cover is applied, handling of the trim strips thereafter may be simplified because they will be essentially straight rather than bowed as would result from the FIG. 12 method of applying the cover.

FIG. 14 schematically illustrates aparatus for producing the flexible trim strip of FIG. 13. An extruder 260 produces the U-shaped core 224. As the strip moves away from the extruder and cools to below its fusion temperature it is slit as by suitable slitting aparatus 241 which may include one or more thin slitting blades 243. Alternatively the slitter may comprise a laser beam cutting apparatus, or any other aparatus suitable for producing successive thin slits, fissures or clefts in the core as the core passes in front of the apparatus, and a succession of such slits are shown at 240 in FIG. 13 to the right-hand side of the slitter.

Following slitting, the cover 250 is supported in such fashion as to insure that the slits 240 are held closed. In the schematic illustration of FIG. 14 the core is maintained in an essentially rectilinear posture by passing it between vertically spaced apart parallel core holders 262 and 264. With the core slits thus held closed the cover is secured to the exterior of the core by any of the fastening techniques heretofore mentioned including specifically heat bonding, adhesive bonding and sonic welding. Adhesive bonding is illustrated in FIG. 14 wherein an adhesive may be applied to the exterior of the core by any suitable applicator means 266 such as a spray system or brush or roller applicator. Thereafter the cover is led to the core and folded about its bight portion 238 and up along its sides as by pressure rollers arranged around the core as at 268 and 270, or by any other suitable apparatus. A mandril 272 may be placed within the U-section of the core to provide support against the pressure rollers 270 as shown in FIG. 15.

While I have shown the slitting operation being carried out in conjunction with the extruder, it is to be understood that the slitting may be accomplished later, a quantity of the core material being first extruded and laid aside for subsequent slitting operations. Similarly, the slitting need not immediately precede application of the cover but may be carried out at some time prior thereto.

The essential requirements of the method of making the trim strip of FIG. 13 include slitting the core to provide the very thin slits or fissures and then maintaining such slits closed during application of the cover to prevent the adhesive and/or cover from entering the slits, and holding the slits closed until the adhesive sets sufficiently so that neither it nor the cover penetrates the slits, and so that the finished trim strip is rectilinear and the slits are not visible.

In the following claims the term "slots" is used in a generic sense to include both the construction shown in FIGS. 3–5 as well as that of FIG. 13, though when the structure of FIG. 13 is specifically intended the term fissure or slit is used.

What is claimed is:

1. A method of making a flexible molding strip for the edge of a structural member comprising the steps of:
    extruding a continuous stiffly resilient U-shaped nonmetallic plastic core member having internal gripping flange means,
    forming transverse slots in the core through an edge thereof at spaced intervals along its length,
    while holding the core to close the slots adhering an opaque elastic cover over the exterior of the core bridging the closed slots, and
    thereafter releasing the core and cover to place the cover in tension across the slots.

2. The invention defined by claim 1 characterized in that the transverse slots are formed by removing a portion of the core at each interval where a slot is found to form a gap in the core thereat, and bending the core along a curve to close said slots prior to adhering the cover thereto.

3. The invention defined in claim 1 characterized in that said slots are formed by transversely slitting the core at spaced intervals to provide essentially closed fissures.

4. The invention defined by claim 1 characterized that while holding the slots closed applying an adhesive to the exterior of the core and then applying the cover to the adhesive coated surface of the core, and holding the slots closed during at least initial curing of the adhesive.

5. The invention defined by claim 1 characterized in that the core is disposed in a substantially rectilinear posture while holding the slots closed.

References Cited

UNITED STATES PATENTS

| | | | |
|---|---|---|---|
| 2,928,201 | 3/1960 | Shanok et al. | 52—716 X |
| 2,954,310 | 9/1960 | Truesdell et al. | 52—716 X |
| 3,197,821 | 8/1965 | Bright | 52—716 X |
| 3,310,928 | 3/1967 | Weimar | 52—716 |
| 3,392,498 | 7/1968 | Rogers | 52—716 X |
| 3,394,044 | 7/1968 | Bright | 52—716 X |
| 3,451,169 | 6/1969 | Arnold et al. | 52—716 X |
| 3,527,013 | 9/1970 | Kruschwitz | 52—716 |
| 3,545,157 | 12/1970 | Cziptschirsch et al. | 49—462 X |
| 3,547,516 | 12/1970 | Shanok et al. | 49—462 X |
| 3,685,231 | 8/1972 | Blose | 52—716 |

FOREIGN PATENTS

| | | |
|---|---|---|
| 1,457,531 | 9/1966 | France. |
| 524,171 | 11/1953 | Belguim. |
| 622,586 | 6/1961 | Canada. |
| 1,044,475 | 9/1966 | Great Britain. |
| 779,868 | 7/1957 | Great Britain. |

CHARLES E. VAN HORN, Primary Examiner

U.S. Cl. X.R.

156—257, 270; 264—145, 177 R